United States Patent
Renz et al.

(10) Patent No.: US 11,220,828 B2
(45) Date of Patent: Jan. 11, 2022

(54) FASTENING ELEMENT FOR WALL FORMWORK

(71) Applicant: Peri AG, Weissenhorn (DE)

(72) Inventors: Bernd Renz, Voehringen (DE);
Wilfried Haeberle, Langenau (DE);
Fabian Knopp, Pfaffenhofen (DE);
Werner Schneider, Erbach (DE)

(73) Assignee: Peri AG, Weissenhorn (DE)

( * ) Notice: Subject to any disclaimer, the term of this patent is extended or adjusted under 35 U.S.C. 154(b) by 0 days.

(21) Appl. No.: 16/092,210

(22) PCT Filed: Apr. 3, 2017

(86) PCT No.: PCT/EP2017/057823
§ 371 (c)(1),
(2) Date: Oct. 8, 2018

(87) PCT Pub. No.: WO2017/174490
PCT Pub. Date: Oct. 12, 2017

(65) Prior Publication Data
US 2020/0332542 A1    Oct. 22, 2020

(30) Foreign Application Priority Data
Apr. 8, 2016   (DE) .................... 10 2016 205 884.3

(51) Int. Cl.
| E04G 17/14 | (2006.01) |
| E04G 11/12 | (2006.01) |
| F16B 7/04  | (2006.01) |
| F16B 7/20  | (2006.01) |

(52) U.S. Cl.
CPC .............. *E04G 17/14* (2013.01); *E04G 11/12* (2013.01); *F16B 7/0406* (2013.01); *F16B 7/20* (2013.01)

(58) Field of Classification Search
CPC ......... E04G 11/08; E04G 17/14; E04G 11/12; F16M 13/00
(Continued)

(56) References Cited

U.S. PATENT DOCUMENTS

| 2,945,662 A * | 7/1960 | Jennings ................. E04G 17/14 |
| | | 254/100 |
| 3,743,232 A | 7/1973 | Vaughan |

(Continued)

FOREIGN PATENT DOCUMENTS

| DE | 9005204 | 7/1990 |
| FR | 1134455 | 4/1957 |

(Continued)

*Primary Examiner* — Paola Agudelo
(74) *Attorney, Agent, or Firm* — Loginov & Associates, PLLC; William A. Loginov

(57) ABSTRACT

A fastening element which can be mounted on the upper side of a positionable formwork wall of a formwork system. The fastening element has an angular element with a first leg and a second leg. The first leg can take the form of a mounting part which can be fastened in a reversibly releasable manner to the positionable formwork wall. As an alternative to this, the first leg can be arranged directly or indirectly on the mounting part. The free end of the second leg has a connection possibility for a push-pull prop or is connected to a push-pull prop. The angular element is preferably designed to be pivotable with respect to the mounting part. With the positionable formwork wall set up, the positionable formwork wall can form, together with the fastening element and the push-pull prop, an arch into which a closing formwork wall can be inserted.

13 Claims, 5 Drawing Sheets

(58) Field of Classification Search
USPC .......................................... 264/31; 249/191
See application file for complete search history.

(56) References Cited

U.S. PATENT DOCUMENTS

| | | | |
|---|---|---|---|
| 4,052,031 A | 10/1977 | Melfi | |
| 5,343,667 A * | 9/1994 | Peden | E04G 17/06 |
| | | | 249/219.1 |
| 5,843,327 A | 12/1998 | Lindgren | |
| 6,247,273 B1 * | 6/2001 | Nickel | E04G 17/14 |
| | | | 182/230 |
| 9,085,441 B2 * | 7/2015 | Mullins | E04G 21/26 |
| 2007/0175174 A1 * | 8/2007 | Bruno | E04G 17/14 |
| | | | 52/745.12 |
| 2009/0057518 A1 * | 3/2009 | Russell | E04G 21/26 |
| | | | 248/354.1 |
| 2009/0101774 A1 * | 4/2009 | Shih | E04G 25/061 |
| | | | 248/200.1 |
| 2010/0218438 A1 * | 9/2010 | Sollars | E04G 13/00 |
| | | | 52/127.2 |
| 2011/0285044 A1 * | 11/2011 | Sollars | E04G 11/08 |
| | | | 264/31 |
| 2012/0018942 A1 | 1/2012 | Penza | |
| 2017/0292280 A1 * | 10/2017 | White | E04G 11/08 |

FOREIGN PATENT DOCUMENTS

| | | |
|---|---|---|
| FR | 1582901 | 10/1969 |
| NZ | 588933 | 12/2011 |
| WO | 2008025050 | 3/2008 |
| WO | 2010088628 | 8/2010 |

* cited by examiner

FASTENING ELEMENT FOR WALL FORMWORK

FIELD OF THE INVENTION

The invention relates to a fastening element for a formwork system for producing a building structure made of cast-in-place concrete. The invention further relates to a formwork system having a fastening element. Finally, the invention relates to a method for constructing a formwork system.

BACKGROUND OF THE INVENTION

It is known to use a formwork system for producing a building structure made of cast-in-place concrete, in particular for producing a concrete wall. In many cases, a positionable formwork wall is used along with a closing formwork wall positioned opposite the positionable formwork wall. The positionable formwork wall as well as the closing formwork wall are each typically supported via at least one push-pull prop, the push-pull prop of the positionable formwork wall extending away from the side of the positionable formwork wall that faces away from the formwork skin and the push-pull prop of the closing formwork wall extending away from the side of the closing formwork wall that faces away from the formwork skin.

For reasons of space, for example if a formwork system is used in a foundation pit, it is sometimes not possible to support both the positionable formwork wall and the closing formwork wall with one push-pull prop each.

A solution to this problem was disclosed in U.S. Pat. No. 4,052,031 A to support both a positionable formwork wall and a closing formwork wall in only one direction with a push-pull prop. To do this, the closing formwork wall has a parallel offset arrangement with respect to the positionable formwork wall, so that the push-pull prop can bypass the closing formwork wall. However, the lateral offset of the closing formwork wall from the positionable formwork wall is frequently undesirable.

A formwork system has been disclosed in WO 2010/088628 A1, wherein a positionable formwork wall and a closing formwork wall are fixedly connected to each other and this connection is supported on one side via push-pull props. Assembly and disassembly of the known formwork systems via the fixed connection of positionable formwork wall and closing formwork wall is expensive and inflexible, however.

SUMMARY OF THE INVENTION

It is therefore the object of the present invention to enable the flexible assembly and disassembly for producing a building structure made from cast-in-place concrete, wherein the formwork system is supported only on one side by one or a plurality of push-pull props.

The object according to the invention is achieved by a formwork system, a formwork system and a method The object according to the invention is thus achieved by a fastening element for a formwork system for producing a building structure made from cast-in-place concrete, in particular for producing a wall. The fastening element has a mounting part that can be fastened to a positionable wall of the formwork system. The fastening element further has an angular element with a first leg and a second leg. The first leg is part of the mounting part or is directly or indirectly arranged on the mounting part. The second leg has a freely projecting end. A push-pull prop of the formwork system is arranged or can be arranged on the otherwise freely projecting end of the second leg. The fastening element as a whole has the shape of a boom.

Positionable formwork wall, closing formwork wall and push-pull prop are designed according to the prior art. In this way, a conventional formwork system according to the prior art, hitherto customary, can be used flexibly at a construction site. If the positionable formwork wall now cannot—as is generally the case—be supported with a push-pull prop on the side of the positionable formwork wall extending away from the formwork skin, the fastening element according to the invention can be used. The fastening element is fastened to the mounting part on the positionable formwork wall. The freely projecting end of the fastening element then serves as an attachment point for a push-pull prop. In a mounted state, the fastening element thus overlaps the formwork skin of the positionable formwork wall so that one support of the positionable formwork wall can be omitted on the side of the positionable formwork wall facing away from the positionable formwork skin. In other words, the positionable formwork wall can be set up tightly against an obstruction without an open space having to be provided in the direction of the obstruction, meaning in the direction facing away from the formwork skin of the positionable formwork wall.

The first leg can be configured as moveable, in particular pivotable to a limited degree relative to the second leg. However, the first leg is preferably configured to be inflexible, immobile or rigid relative to the second leg. This simplifies the structural design of the fastening element.

In order to facilitate the mounting of the fastening element to the positionable formwork wall if the positionable formwork wall is essentially lying flat on the ground, the freely projecting end of the second leg in a particularly preferred embodiment of the invention can be movable relative to the mounting part. In this case, the freely projecting end of the second leg can be lifted off the mounting part and the fastening element can be fastened onto the positionable formwork wall without lifting the positionable formwork wall that is essentially on the ground.

The movability of the freely projecting end of the second leg relative to the mounting part is advantageously achieved by arranging the angular element so that it is pivotable to at least a limited degree on the mounting part. The second leg is thus preferably configured rigid relative to the first leg. The fastening element further preferably has a mounting position, wherein the angular element can be latched in a reversibly releasable manner relative to the mounting part. In the mounting position, the angular element can thereby be firmly fastened relative to the mounting part so that the freely projecting end of the second leg represents a firm connection point in the mounted state of the formwork system. The first leg is preferably arranged to within ±20° of parallel to the mounting part.

The push-pull prop can be arranged on the fastening element so that it is pivotable to a limited degree, yet permanently attached. However, the push-pull prop can be preferably mounted in a releasably latchable manner on the end of the second leg. The push-pull prop can thus also be used—without the fastening element—in a conventional manner. The fastening element can also be transported more easily because of this.

In a further preferred embodiment of the invention, the engagement of the push-pull prop can be released via remote actuation. The remote actuation can be designed in the form of a rod that can be used to open the latching connection. For example, the latching connection of the fastening element can have a cap that is movable via remote actuation in order to be able to remove the push-pull prop from the fastening element.

The mounting part of the fastening element can be mounted via a frictional locking connection to the positionable formwork wall. Alternatively or additionally, the mounting part can be mountable via a positively locking connection to the positionable formwork wall. The form-fitting connection thus preferably has at least one pin that can be inserted into a recess, wherein a latching element that can be moved by a user can secure the arrangement of the pin in the recess.

On the free end of the fastening element, the fastening element can have a quick connector for the push-pull prop. The term quick connector is understood here as a connection option that permits a secure latching of the push-pull prop via its insertion into the quick connector. Alternatively or additionally to the quick connector, the free end of the fastening element can have a bolt by which the fastening element can be connected to the push-pull prop.

The object according to the invention is further achieved by a formwork system for producing a building structure made of cast-in-place concrete with a fastening element as described above. The formwork system further has a positionable formwork wall and a closing formwork wall. The fastening element is arranged on the positionable formwork wall. The formwork system further has a push-pull prop that is arranged on the otherwise-free end of the second leg of the fastening element. In the mounted state of the formwork system, the fastening element overlaps the formwork skin of the positionable formwork wall and the formwork skin of the closing formwork wall.

According to the invention, the formwork system can be serviced completely from the closing formwork wall. In particular, it is possible to use a one-sided anchorage of the closing formwork wall. No work is required on the positionable side because of the one-sided anchorage.

The fastening element is not directly connected to the closing formwork wall. As a result, the positionable formwork wall can first be set up together with the fastening element during the construction of the formwork system. The positionable formwork wall can be supported by the push-pull prop. This now safely standing part of the formwork system can be expanded flexibly via the closing formwork wall.

The push-pull prop can be telescopically designed. Alternatively or additionally to this, the push-pull prop can have two parts that are connected via a threaded connection in order to be able to adjust the length of the push-pull prop.

The positionable formwork wall and the closing formwork wall are preferably of identical design.

In a particularly preferable embodiment of the formwork system, the positionable and/or the closing formwork wall are each configured in the shape of a frame panel formwork.

The object according to the invention is finally achieved by a method for building a formwork system for producing a building structure made of cast-in-place concrete, in particular for building the formwork system described above. The method has the following steps:

I) Securing a fastening element, in particular a fastening element as described above, to a positionable formwork wall.

II) Setting up the positionable formwork wall, in particular using a crane;

III) Securing the positionable formwork wall against accidents via a push-pull prop attached to the fastening element, wherein the push-pull prop can be arranged on the fastening element before or after setting up the positionable formwork wall.

IV) Placing a closing formwork wall below the fastening element.

Additional method steps can be performed before method step I), between method steps II-IV) and/or after method step IV).

Preferably, the method step

V) connecting the closing formwork wall to the positionable formwork wall by at least one formwork anchor of the formwork system is performed after method step IV).

The closing formwork wall is preferably not supported by its own push-pull prop, but is secured against falling over by formwork anchors through the positionable formwork wall, the fastening element and the push-pull prop on the fastening element.

BRIEF DESCRIPTION OF THE DRAWINGS

Further features and advantages of the invention are presented in the following detailed description of an exemplary embodiment of the invention, in the claims and in reference to the figures of the drawing, which show details that are essential to the invention. The various features can each be realized in variants of the invention individually or in groups in any combination. The features shown in the drawing are depicted in such a way that the special features according to the invention can be made clearly visible.

Shown are:

FIG. 2b a perspective view of a first section from FIG. 2a;

FIG. 2c a perspective view of a second section from FIG. 2a;

DETAILED DESCRIPTION

Figure 1A:
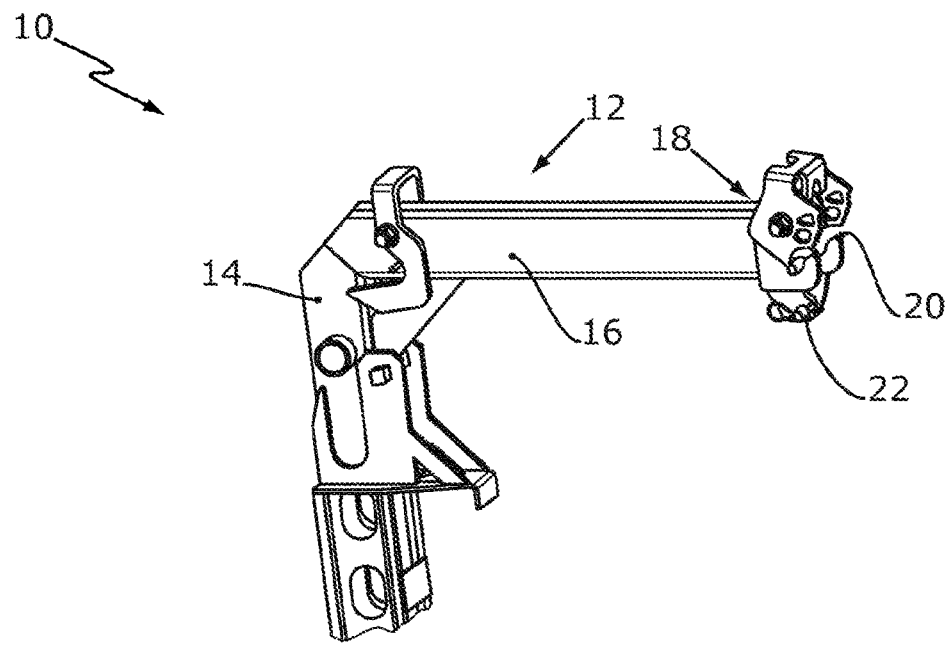
FIG. 1a a perspective view of a part of a fastening element.

FIG. 1a shows a fastening element 10 with an angular element 12. Angular element 12 has a first leg 14 and a second leg 16. Second leg 16 is arranged perpendicular to first leg 14 approximately ±30°, in particular ±20°. Second leg 16 is rigidly connected to first leg 14.

Second leg 16 has a free end 18. Fastening element 10 has a first push-pull prop connection 20 and a second push-pull prop 22 on its free end 18.

Figure 1B:
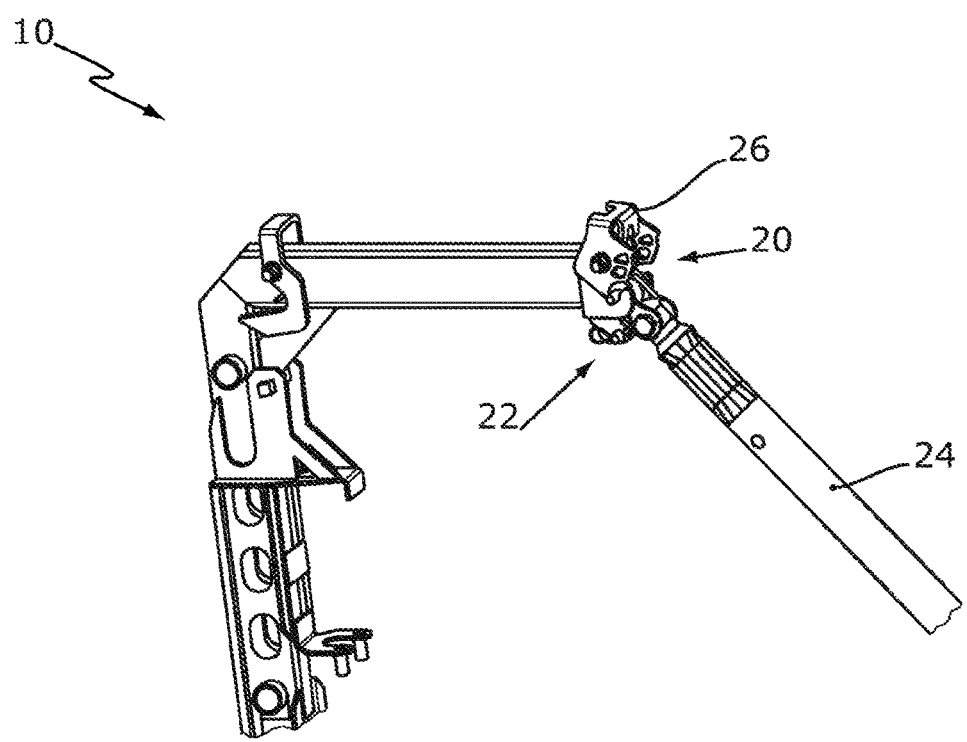
FIG. 1b a perspective view of the fastening element according to FIG. 1a with a push-pull prop arranged on the fastening element.

FIG. 1b shows fastening element 10 according to FIG. 1a, a push-pull prop 24 being arranged on the first push-pull prop connection 20. First push-pull prop connection 20 here has a cap 26 which is pivotable to at least a limited degree and is shown in FIG. 1b in a swung-out state. Alternatively to the arrangement shown in FIG. 1b, push-pull prop 24 can be arranged on second push-pull prop receptacle 22 via a bolt that is secured with a cotter pin. Also on second push-pull prop receptacle 22, second push-pull prop 24 is pivotably arranged to a limited degree, but permanently, on fastening element 10.

Figure 1C:
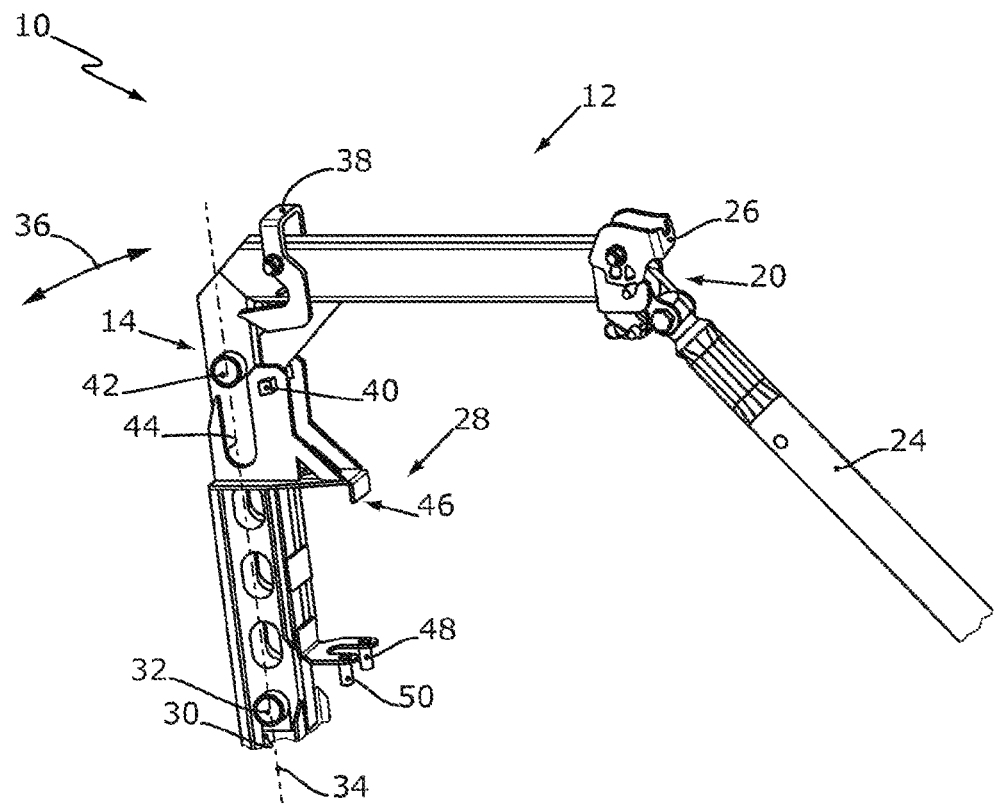
FIG. 1c a perspective view of the fastening element according to FIG. 1b, the push-pull prop in FIG. 1c being fixed to the fastening element.

FIG. 1c shows fastening element 10 according to FIG. 1b, cap 26 being illustrated in the closed state. Push-pull prop 24 is thereby held on fastening element 10 to at least a limited degree in a pivotable manner. In order to remove push-pull prop 24, cap 26 must be transferred into the opened state according to FIG. 1b. To do this, cap 26 can be pivoted via a remote actuation (not shown) in particular in the form of a rod. In other words, the latching connection between push-pull prop 24 and fastening element 10 can be released via the remote actuation.

Cap 26 is thus designed in such a manner that it closes when push-pull prop 24 is inserted into first push-pull prop connection 20. Push-pull prop 24 can thereby be arranged on first push-pull prop connection 20, even if fastening element 10 is already at a great height and push-pull prop 24 is inserted into push-pull prop connection 20 by a construction worker who is on the ground. Cap 26 can be retained in its closed state according to FIG. 1c by a spring element (not shown) and/or via friction. First push-pull prop connection 20 is thus designed in the form of a quick connector.

Fastening element 10 has a mounting part 28. Mounting part 28 has a longitudinal hole 30 into which a first bolt 32 is inserted which is arranged on first leg 14 so that angular element 12 can be displaced in the direction of longitudinal axis 34 of mounting part 28 to at least a limited degree and can be pivoted to at least a limited degree around the axis of first bolt 32 in the direction of a double arrow 36. Fastening element 10 can be easily mounted because of the pivotability (see FIG. 2a). The movability of angular element 12 relative to mounting part 28 can be canceled, however, via a latching of a pivoting clip 38 to a latching projection 40 of mounting part 28 if a second bolt 42 of angular element 12 is in a groove 44 of mounting part 28.

Mounting part 28 has a gripping bracket 46 for installing mounting part 28. Mounting part 28 can further have at least one projection 48, 50 for installing mounting part 28. The at least one projection 48, 50 is preferably designed—as shown—in the form of a pin.

Figure 2A:
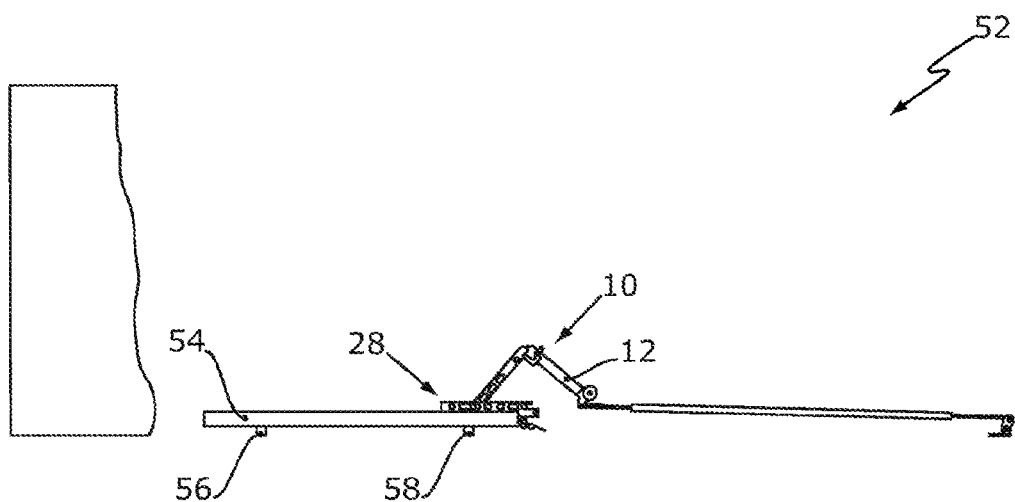
FIG. 2a a schematic side view of a formwork system having a positionable formwork wall as well as the fastening element and the push-pull prop according to FIG. 1c arranged thereupon.

FIG. 2a shows a formwork system 52 having the previously described fastening element 10. Fastening element 10 is arranged with its mounting part 28 on a positionable formwork wall 54. Positionable formwork wall 54 is supported above wooden slats 56, 58 essentially level on the ground. Because of the pivotability (see double arrow 36 in FIG. 1c) of angular element 12 relative to mounting part 28, fastening element 10 can be mounted on positionable formwork wall 54 without having to lift positionable formwork wall 54.

Figure 2B:
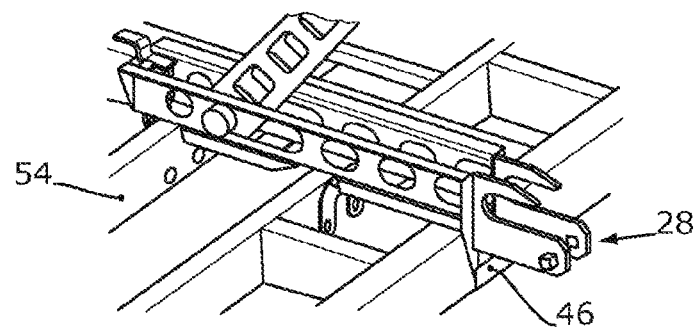

FIG. 2b shows the installation of mounting part 28 to positionable formwork wall 54 in a first view. Gripping bracket 46 thus partly overlaps positionable formwork wall 54.

Figure 2C:
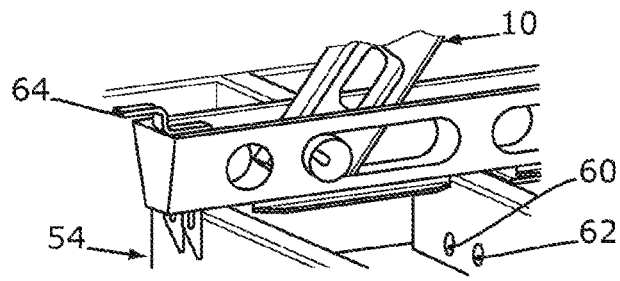

FIG. 2c shows an additional view of the attachment of fastening element 10 to positionable formwork wall 54. It is clear from viewing FIG. 1c and FIG. 2c together that projections 48, 50 (see FIG. 1c) are inserted in matching recesses 60, 62 of positionable formwork wall 54. A latching element 64 that is displaceable to a limited degree secures fastening element 10 to positionable formwork wall 54 by pushed-forward latching element 64 preventing the removal of projection 48, 50 (see FIG. 1c) from recesses 60, 62. Fastening element 10 is thereby retained in a reversibly releasable manner via a positive fit to positionable formwork wall 54.

Figure 2D:
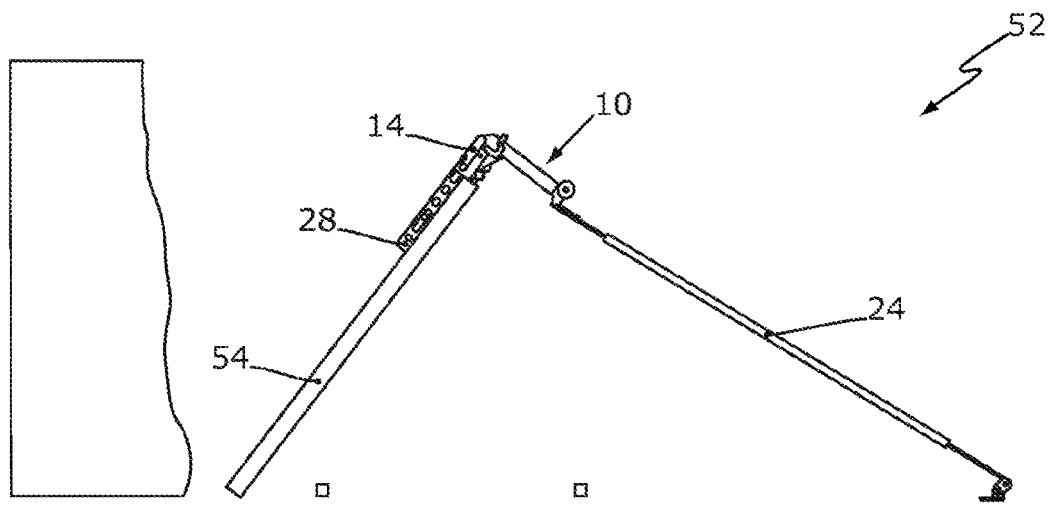
FIG. 2d a schematic side view of the formwork system according to FIG. 2a in a partially set-up state.

FIG. 2d shows the setting-up of formwork system 52. First leg 14 of fastening element 10 is here parallel to longitudinal axis 34 (see FIG. 1c) of mounting part 28. However, second bolt 42 (see FIG. 1c) is not yet inserted into groove 44 (see FIG. 1c). The setup of positionable formwork wall 54 can be accomplished using a crane and/or via push-pull props 24.

Figure 2E:
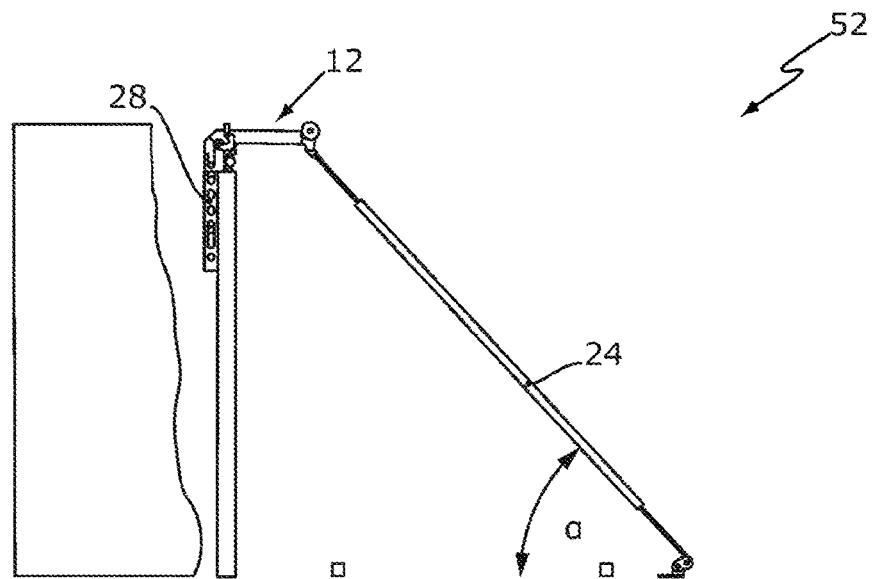
FIG. 2e a schematic side view of the formwork system according to FIG. 2d in a fully set-up state FIG. 2f a schematic side view of the formwork system according to FIG. 2e, the formwork system having a closing formwork wall.

FIG. 2e shows formwork system 52 in the set-up state. For this, push-pull prop 24 preferably has an angle a of between 20° and 70° to the ground. Because of gravity, angular element 12 is immersed into mounting part 28 as far as possible. Second bolt 42 (see FIG. 1c) is on the stop of groove 44 (see FIG. 1c) and the free end of pivoting clip 38 (see FIG. 1c) engages behind latching projection 40 (see FIG. 1c). Angular element 12 is thus in a mounting position in which it is arranged in a releasably latchable manner on mounting part 28.

Figure 2F:
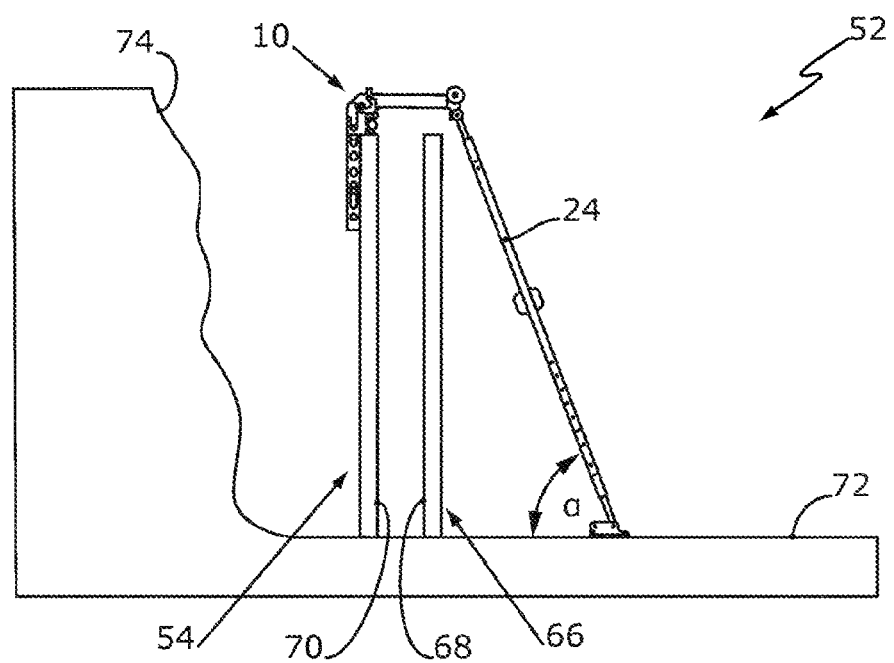

FIG. 2f shows completed formwork system 52. Formwork system 52 here has a closing formwork wall 66. A formwork skin 68 of closing formwork wall 66 thus runs up to ±20° parallel to a formwork skin 70 of positionable formwork wall 54. Closing formwork wall 66 in not directly connected to either fastening element 10 nor to push-pull prop 24. Push-pull prop 24 in the fully mounted state of formwork system 52 encloses—as shown in FIG. 2f—an angle between 60° and 80° with the ground 72.

Both positionable formwork wall 54 and closing formwork wall 66 are each designed in the form of a frame panel formwork element.

Fastening element 10 connects push-pull prop 24 to positionable formwork wall 54 over closing formwork wall 66. In this manner, positionable formwork wall 54 can be secured against accidents with push-pull prop 24, despite an obstruction 74.

Figure 2G:
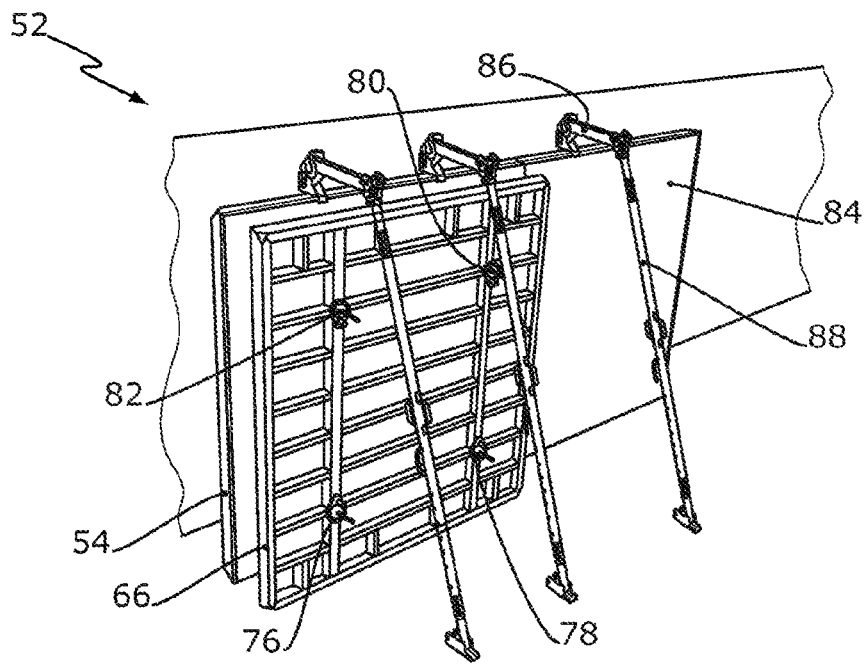
FIG. 2g a perspective view of the formwork system according to FIG. 2f.

FIG. 2g shows formwork system 52 according to FIG. 2f in a perspective view. According to FIG. 2, in a further step, closing formwork wall 66 is secured by formwork anchors 76, 78, 80, 82 against falling over, formwork anchors 76, 78, 80, 82 being connected to positionable formwork wall 54. An additional positionable formwork wall 84 is attached to positionable formwork wall 54 that is connected via formwork locks (not shown) to positionable formwork wall 54. Additional positionable formwork wall 84 is of identical design to positionable formwork wall 54. Additional positionable formwork wall 84 is secured against accidents via an additional fastening element 86 that is connected to additional push-pull prop 88.

Figure 2H:
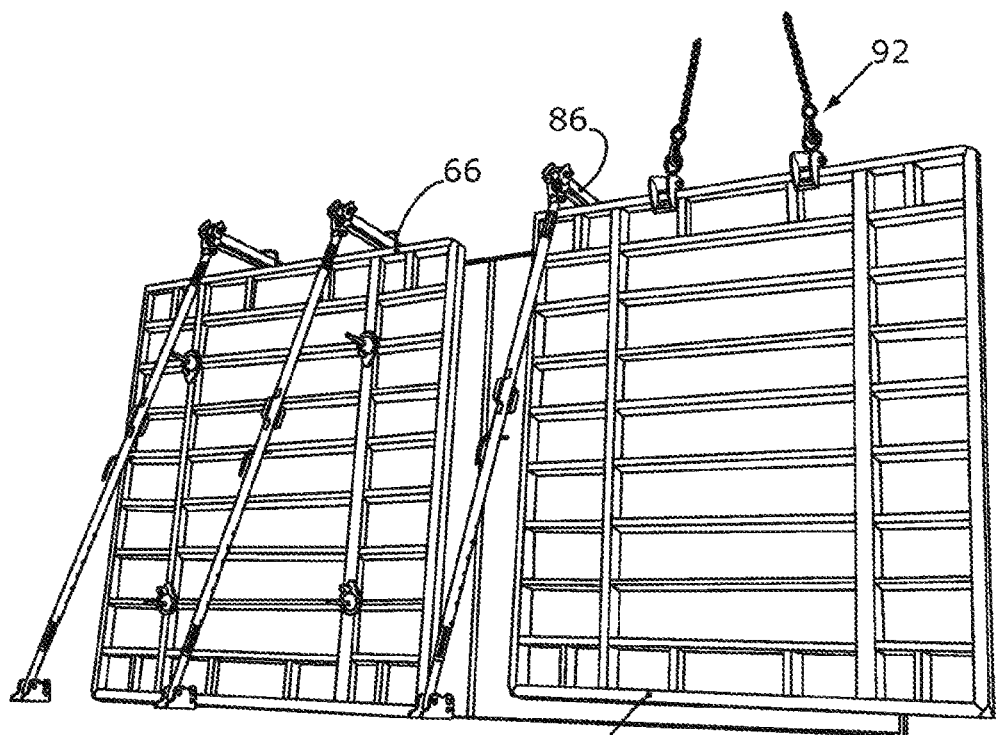
FIG. 2h a perspective view of the formwork system according to FIG. 2g during the completion of the formwork system with an additional closing formwork wall.

FIG. 2h shows the arrangement of an additional closing formwork wall 90 on closing formwork wall 66. Additional closing formwork wall 90 is pivoted in below additional fastening element 86—via crane suspension gear 92 that is indicated in FIG. 2h—and arranged on closing formwork wall 66. To do this, crane suspension gear 92 can, as needed, be reslung when additional closing formwork wall 90 is brought in.

When viewing all figures of the drawing together, the invention relates, in summary, to a fastening element 10, 86 that can be mounted on the upper side of a positionable formwork wall 54, 84 of a formwork system 52. Fastening element 10, 86 has an angular element 12 with a first leg 14 and a second leg 16. The first leg 14 can take the form of a mounting part 28 which can be fastened in a reversibly releasable manner to positionable formwork wall 54, 84. As an alternative to this, the first leg 14 can be arranged directly or indirectly on the mounting part. 28 Free end 18 of second leg 16 has a connection possibility for a push-pull prop 24, 88 or is connected to a push-pull prop 24, 88. Angular element 12 is preferably designed to be pivotable with respect to mounting part 28. With positionable formwork wall 54, 84 set up, positionable formwork wall 54, 84 can form, together with fastening element 10, 86 and push-pull prop 24, 88, an arch into which a closing formwork wall 66, 90 can be inserted.

The invention claimed is:

1. A fastening element for a formwork system for producing a building structure from cast-in-place concrete, the fastening element comprising:
    a) a mounting part that can be mounted in a reversibly releasable manner to a positionable formwork wall of the formwork system, the mounting part defining an elongated hole configured to receive a first bolt;
    b) an angular element having
        i. a first leg that is removably engageable with the mounting part via the first bolt such that the angular element is displaceable along a direction of a longitudinal axis of the mounting part and is pivotable about an axis of the first bolt;
        ii. a second leg arranged or configured at an angle to the first leg;
        wherein a push-pull prop of the formwork system can be arranged or is arranged on the end of the second leg that freely projects up to the push-pull prop.

2. The fastening element according to claim 1, wherein the first leg is designed to be rigid relative to the second leg.

3. The fastening element according to claim 1, wherein the freely projecting end of the second leg can be moved relative to the mounting part.

4. The fastening element according to claim 3, wherein the angular element is arranged so that it is pivotable to at least a limited degree on the mounting part.

5. The fastening element according to claim 4, wherein the angular element is arranged in a releasably latchable manner on the mounting part by virtue of the pivotability of the angular element relative to the mounting part.

6. The fastening element according to claim 1, wherein the push-pull prop can be mounted in a releasably latchable manner on the end of the second leg.

7. The fastening element according to claim 6, wherein the engagement of the push-pull prop on the end of the second leg is releasable in a remotely actuated manner.

8. The fastening element according to claim 1, wherein the mounting part can be mounted to the positionable formwork wall via projections of the mounting element with respect to recesses defined by the positionable formwork wall.

9. The fastening element according to claim 1, wherein the push-pull prop is configured to brace the positionable formwork wall while forming an arch with the positionable formwork wall and the fastening element over the closing formwork wall without directly connecting the closing formwork wall to the fastening element.

10. A formwork system for producing a building structure made of cast-in-place concrete, the formwork system comprising:
    A) the positionable formwork wall;
    B) a closing formwork wall arranged opposite the positionable formwork wall;
    C) the fastening element arranged in a reversibly releasable manner on the positionable formwork wall according to claim 1;
    D) the push-pull prop arranged on the free end of the second leg of the fastening element.

11. The formwork system according to claim 10, wherein the positionable formwork wall and/or the closing formwork wall are configured in the shape of a frame panel formwork element.

12. A method for constructing a formwork system for producing a building structure from cast-in-place concrete, wherein the method has the following method steps:
    I) mounting a fastening element on the edge region of a positionable formwork wall;
    II) setting up the positionable formwork wall;
    III) propping of the positionable formwork wall via a push-pull prop arranged on the fastening element;
    IV) insertion of a closing formwork wall below the fastening element.

13. A fastening element as an attachment point of a push-pull prop on a positionable formwork wall of a formwork system having the positionable formwork wall, a closing formwork wall, and the push-pull prop for producing a building structure from cast-in-place concrete, the fastening element comprising:
    a mounting part mountable in a reversible and detachable manner on an upper side of the positionable formwork wall and that defines an elongated hole configured to receive a first bolt;
    an angular element having
        a first leg that is removably engageable with the mounting part via the first bolt such that the angular element is displaceable along a direction of a longitudinal axis of the mounting part and is pivotable about an axis of the first bolt;
        a second limb arranged at an angle with respect to the first limb;
    wherein the push-pull prop of the formwork system is configured to be arranged on an end of the second limb, which projects freely to the push-pull prop such that the push-pull prop is configured to brace the positionable formwork wall while forming an arch with the positionable formwork wall and the fastening element over the closing formwork wall without directly connecting the closing formwork wall to the fastening element.

* * * * *